(12) United States Patent
Hsiung

(10) Patent No.: US 11,495,241 B2
(45) Date of Patent: Nov. 8, 2022

(54) ECHO DELAY TIME ESTIMATION METHOD AND SYSTEM THEREOF

(71) Applicant: QNAP SYSTEMS, INC., New Taipei (TW)

(72) Inventor: Wei-Wei Hsiung, New Taipei (TW)

(73) Assignee: QNAP Systems, Inc., New Taipei (TW)

(*) Notice: Subject to any disclaimer, the term of this patent is extended or adjusted under 35 U.S.C. 154(b) by 0 days.

(21) Appl. No.: 17/205,377

(22) Filed: Mar. 18, 2021

(65) Prior Publication Data
US 2022/0238130 A1    Jul. 28, 2022

(30) Foreign Application Priority Data
Jan. 22, 2021  (TW) ................ 110102441

(51) Int. Cl.
*G10L 21/0232*  (2013.01)
*G10L 25/06*  (2013.01)
(Continued)

(52) U.S. Cl.
CPC .......... *G10L 21/0232* (2013.01); *G10L 25/06* (2013.01); *G10L 25/18* (2013.01); *G10L 2021/02082* (2013.01)

(58) Field of Classification Search
CPC ..... G10L 21/0232; G10L 25/06; G10L 25/18; G10L 2021/02082
See application file for complete search history.

(56) References Cited

U.S. PATENT DOCUMENTS 6,766,019 B1 * 7/2004 Benesty ................ H04M 9/082
  379/406.01
10,117,021 B1 * 10/2018 Truong .................. H03G 5/025
(Continued)

FOREIGN PATENT DOCUMENTS

CN    105989850 A  * 10/2016  ......... G10L 21/0208
CN    106210371 A  * 12/2016  ............. H04M 1/20
(Continued)

OTHER PUBLICATIONS

Search Report Issued by International Patent Office in Corresponding Application No. 11120370630/110102441.

*Primary Examiner* — David L Ton
(74) *Attorney, Agent, or Firm* — Rosenberg, Klein & Lee

(57) ABSTRACT

Provided are an echo delay time estimation method and system thereof, wherein the echo delay time estimation method is executed by the echo delay time estimation system with the following steps: receiving a testing signal and a received signal and executing a time to frequency analysis to generate a testing signal spectrogram and a received signal spectrogram; respectively executing a characteristic signal dynamic detection calculation for the testing signal spectrogram and the received signal spectrogram to generate a testing signal characteristic dynamic vector and a received signal characteristic dynamic vector; executing a cross-correlated vector estimation for the testing signal characteristic dynamic vector and the received signal characteristic dynamic vector to generate a cross-correlated vector; and calculating an echo delay time according to the cross-correlated vector. The echo delay time estimation method is able to simplify calculations for estimating an echo delay time, alleviating some computational complexity.

15 Claims, 8 Drawing Sheets

(51) Int. Cl.
*G10L 25/18* (2013.01)
*G10L 21/0208* (2013.01)

(56) References Cited

U.S. PATENT DOCUMENTS

| | | | |
|---|---|---|---|
| 10,650,840 B1 | 5/2020 | Solbach | |
| 2006/0256974 A1* | 11/2006 | Oxford | H04R 3/005 381/66 |
| 2008/0240414 A1* | 10/2008 | Mohammad | H04M 9/082 379/406.08 |
| 2019/0027160 A1 | 1/2019 | Liang | |
| 2020/0051581 A1* | 2/2020 | Luis Valero | H04M 9/082 |

FOREIGN PATENT DOCUMENTS

| | | | | |
|---|---|---|---|---|
| EP | 3703052 A1 | 9/2020 | | |
| KR | 20150112716 A | * | 10/2015 | H04M 3/002 |

\* cited by examiner

ECHO DELAY TIME ESTIMATION METHOD AND SYSTEM THEREOF

CROSS-REFERENCE TO RELATED APPLICATIONS

This application claims the priority benefit of TW application serial No. 110102441 filed on Jan. 22, 2021. The entirety of the above-mentioned patent application is hereby incorporated by reference herein and made a part of specification.

BACKGROUND OF THE INVENTION

1. Field of the Invention

The present invention relates to a delay time estimation method and a system thereof, and more particularly to an echo delay time estimation method and system thereof.

2. Description of the Related Art

As video conferences becomes popular for business meetings, demands for equipment for the video conferences are also raised. During video conferences, often a part of sound coming out of a speaker is picked up by a microphone, initiating a loop of sounds between microphones and speakers. This sound oscillation is an echo, disturbing the quality of the video conferences.

An important step to cancel the echo of the video conferences is to estimate an echo delay time. Once obtaining the echo delay time, most video conference software will be able to suppress the echo with its own algorithm. However, a common echo delay time estimation method is time consuming and complicated, creating quite a computational complexity on the video conferences equipment.

For instance, a common echo cancelling system would suppress an echo by measuring an acoustic impulse response of an environment. First the echo cancelling system will broadcast a testing impulse signal through a speaker, and then a microphone will pick up a received signal. The echo cancelling system will then calculate a cross-correlation of the testing signal and the received signal in time domain. However in real spaces, environmental factors can change over a period of time. Time dependent environmental changes in temperature and relative object positions can increase margins of error for the aforementioned cross-correlation.

The common echo cancelling system will also be affected by the quality of video conferences equipment. For instance, if the testing signal impulse cannot be cleanly broadcasted because of problems of a speaker, it will be more difficult to calculate cross-correlation of the testing signal and the received signal, causing an extra cost for a computing system.

Furthermore, the common echo cancelling system often uses an adaptive filter to suppress the echo. The adaptive filter would include a least mean square (LMS) filter and a recursive least squares (RLS) filter. The least mean square (LMS) filter will estimate the gradient of the received signal through each iteration. Since the gradient estimation technique is a stochastic gradient descent (SGD) method, the estimation is time consuming and complicated to calculate. The recursive least squares (RLS) filter will recursively adjust the weights of corrections for an estimation. The recursive least squares (RLS) filter takes less time to calculate an estimation, and calculations of the recursive least squares (RLS) filter are even more complicated than the least mean squares (LMS) filter's, causing the computing system to process extra computational loads.

The common echo delay time estimation technique suffers as its margins of error are affected by environmental changes during video conferences, as its computational complexity increases whenever the speaker used in the video conferences cannot produce clean testing signals, and as its computational complexity also increases by using complicated filters to calculate.

SUMMARY OF THE INVENTION

An objective of the present invention is to provide an echo delay time estimation method and system thereof to mitigate a problem of an echo canceling system wherein the computational complexity is heavy and margins of error is wide.

The echo delay time estimation system includes a pre-processing device, a dynamic vector calculating device, and a cross-correlation calculating device.

The pre-processing device receives a testing signal and a received signal, and respectively executes a time to frequency analysis to generate a testing signal spectrogram and a received signal spectrogram.

The dynamic vector calculating device is electrically connected to the pre-processing device, receives the testing signal spectrogram and the received signal spectrogram, and respectively executes a characteristic signal dynamic detection calculation for the testing signal spectrogram and the received signal spectrogram to generate a testing signal characteristic dynamic vector and a received signal characteristic dynamic vector.

The cross-correlation calculating device is electrically connected to the dynamic vector calculating device, receives the testing signal characteristic dynamic vector and the received signal characteristic dynamic vector, executes a cross-correlation vector calculation for the testing signal characteristic dynamic vector and the received signal characteristic dynamic vector to generate a cross-correlated vector, and calculates an echo delay time according to the cross-correlated vector.

Furthermore, the echo delay time estimation method includes the following steps:

receiving a testing signal and a received signal;

respectively executing a time to frequency analysis for the testing signal and the received signal to generate a testing signal spectrogram and a received signal spectrogram;

respectively executing a characteristic signal dynamic detection calculation for the testing signal spectrogram and the received signal spectrogram to generate a testing signal characteristic dynamic vector and a received signal characteristic dynamic vector;

executing a cross-correlation vector calculation for the testing signal characteristic dynamic vector and the received signal characteristic dynamic vector to generate a cross-correlated vector; and calculating an echo delay time according to the cross-correlated vector.

The present invention uses addition and subtraction to calculate shifting of the cross-correlated vector in frequency domain. By avoiding executing cross-correlation calculations in time domain, the echo delay time estimation method is able to ensure a better delay time estimation accuracy as calculations in frequency domain will not be affected by non-linear sounds and non-linear environmental changes in the time domain. Therefore, the echo delay time estimation method may estimate an echo delay time with stability and tolerance.

Since the echo delay time estimation method only executes addition and subtraction calculations in the frequency domain to obtain the cross-correlated vector, the echo delay time estimation method does not need to execute convolution calculations in the time domain, and is able to simplify calculations to alleviate some computational complexity.

DETAILED DESCRIPTION OF THE INVENTION

Figure 1:
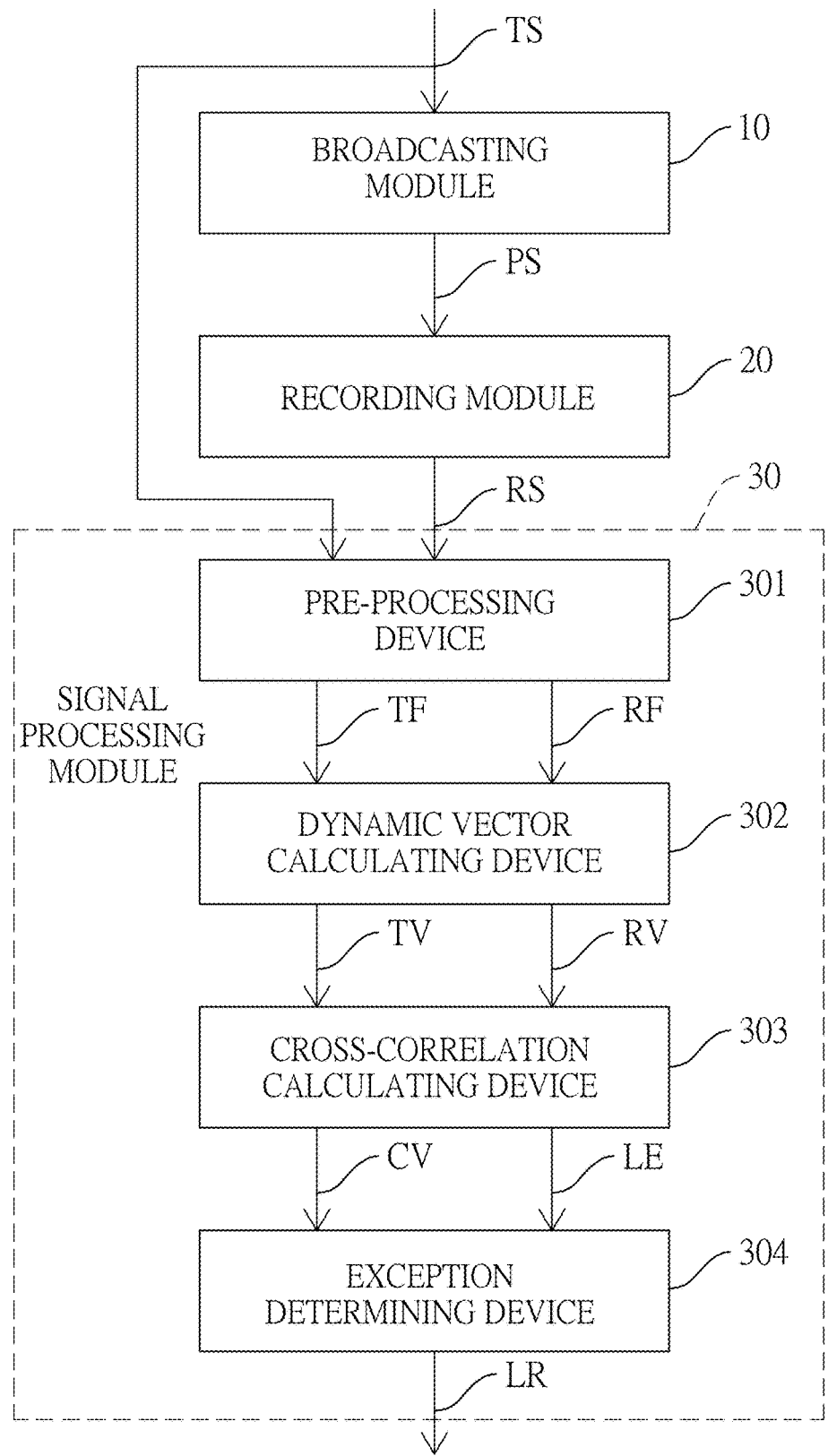
FIG. 1 is a block diagram of an echo delay time estimation system.

The following describes an embodiment of an echo delay time estimation method and system thereof. With reference to FIG. 1, an embodiment of the echo delay time estimation system includes a signal processing module 30. The signal processing module 30 has a pre-processing device 301, a dynamic vector calculating device 302, a cross-correlation calculating device 303, and an exception determining device 304.

The pre-processing device 301 receives a testing signal TS and a received signal RS, and respectively executes a time to frequency analysis to generate a testing signal spectrogram TF and a received signal spectrogram RF. The dynamic vector calculating device 302 is electrically connected to the pre-processing device 301, receives the testing signal spectrogram TF and the received signal spectrogram RF, and respectively executes a characteristic signal dynamic detection calculation for the testing signal spectrogram TF and the received signal spectrogram RF to generate a testing signal characteristic dynamic vector TV and a received signal characteristic dynamic vector RV. The cross-correlation calculating device 303 is electrically connected to the dynamic vector calculating device 302, receives the testing signal characteristic dynamic vector TV and the received signal characteristic dynamic vector RV, and executes a cross-correlation vector calculation for the testing signal characteristic dynamic vector TV and the received signal characteristic dynamic vector RV to generate across-correlated vector CV. The exception determining device 304 is electrically connected to the cross-correlation calculating device 303, receives the cross-correlated vector CV, and then determines an echo delay time LR.

Figure 2:
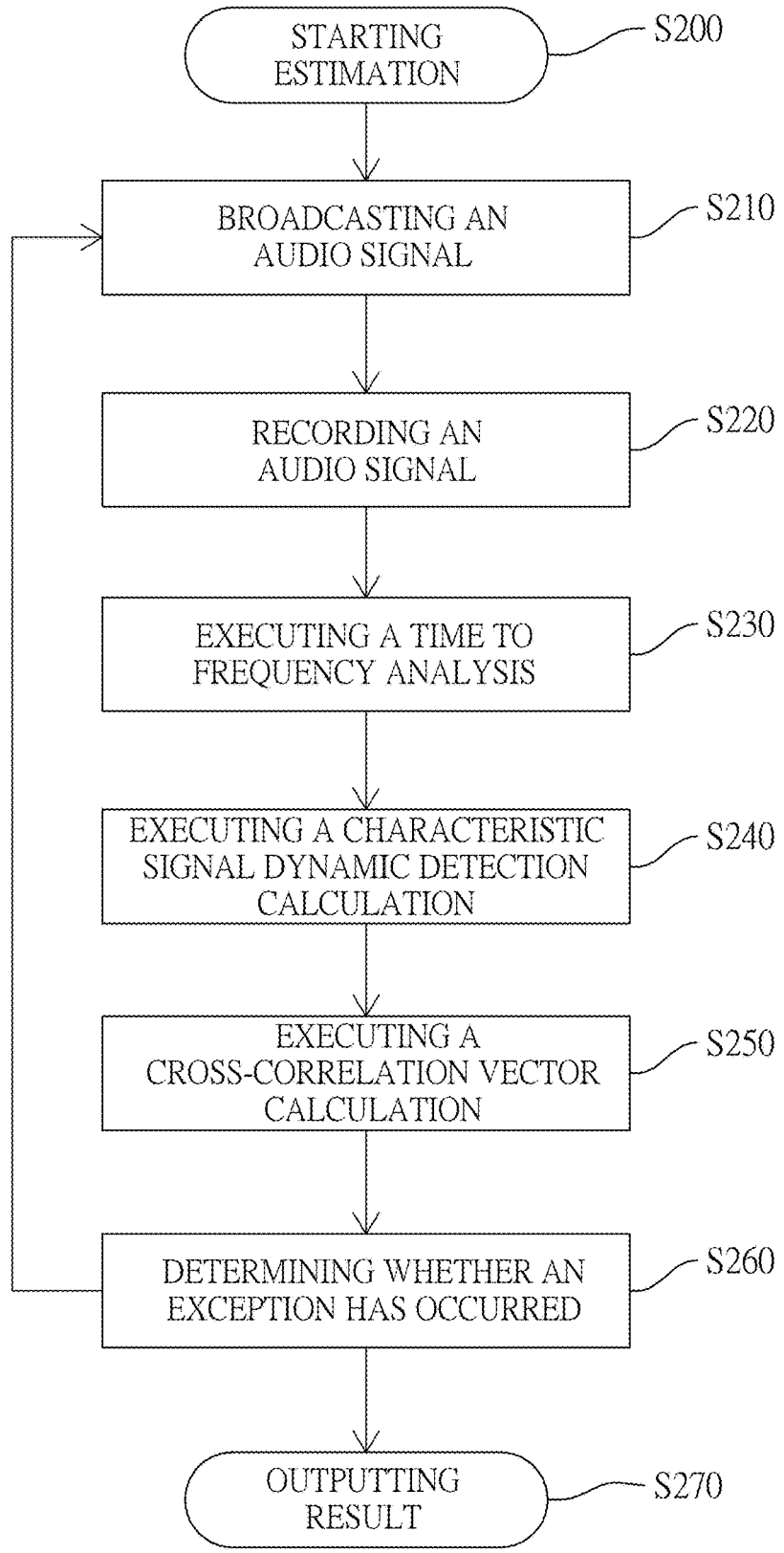
FIG. 2 is a flow chart of the echo delay time estimation system.

With reference to FIG. 2, the echo delay time estimation method includes the following steps:

step S220: receiving a testing signal TS and recording a received signal RS;

step S230: generating a testing signal spectrogram TF and a received signal spectrogram RF by respectively executing a time to frequency analysis for the testing signal TS and the received signal RS;

step S240: generating a testing signal characteristic dynamic vector TV and a received signal characteristic dynamic vector RV by respectively executing a characteristic signal dynamic detection calculation for the testing signal spectrogram TF and the received signal spectrogram RF;

step S250: generating a cross-correlated vector CV by executing a cross-correlation vector calculation for the testing signal characteristic dynamic vector TV and the received signal characteristic dynamic vector RV; and step S270: calculating an echo delay time LR according to the obtained cross-correlated vector CV.

More particularly in steps S220 and S230, the pre-processing device 301 receives a testing signal TS and a received signal RS, and respectively executes a time to frequency analysis, and transforms both signals from time domain to frequency domain to generate a testing signal spectrogram TF and a received signal spectrogram RF. A reason to do signal transformation from time domain to frequency domain is that calculations would become simpler. A signal in the time domain would be hard to analyze and deconstruct given linear and non-linear wave shapes, but a signal in the frequency domain can be easily represented and easily quantified. A spectrogram has an axis representing time and another axis representing frequency, and more specifically, the horizontal axis is time and the vertical axis is frequency. With reference to FIG. 3B, changes in brightness in a testing signal spectrogram correspond to changes in signal strength. By looking at a spectrogram, signal strength distributions across different frequencies in a given time can be known.

To transform signal from time domain to frequency domain, a short-time Fourier transform (STFT) or a Goertzel Filter, for example, can be used. In practice, results of different signal transformation methods can be monitored to decide whichever method can produce the least amount of signal noise for the testing signal spectrogram TF and the received signal spectrogram RF. The short-time Fourier transform (STFT) is a type of Fourier transform. A Fourier transform is a linear integral transformation method often used for transformations between time domain and frequency domain. The Fourier transform would take an integral encompassing all signal areas within a space; in other words, if the signal is in time domain, the Fourier transform would take an integral spanning from minus infinite time to plus infinite time, meaning it integrates across all times, and if a signal exists in the frequency domain, the Fourier transform would integrate the signal across all frequency spectra. Different from the Fourier transform, the short-time Fourier transform (STFT) method integrates only equally separated signal segments within a domain. The short-time Fourier transform (STFT) method shortened integration windows in the time domain, preserving a more complete spectrum in the frequency domain. The Goertzel filter method though also uses integration windows to analyze the signal in segments, its iteration method differs from the short-time Fourier transform (STFT) method. Since transformation methods are not the focus of the present invention, as long as a method can transform a signal from time domain to frequency domain with high frequency resolution, the method would be considered usable.

Figure 3A:
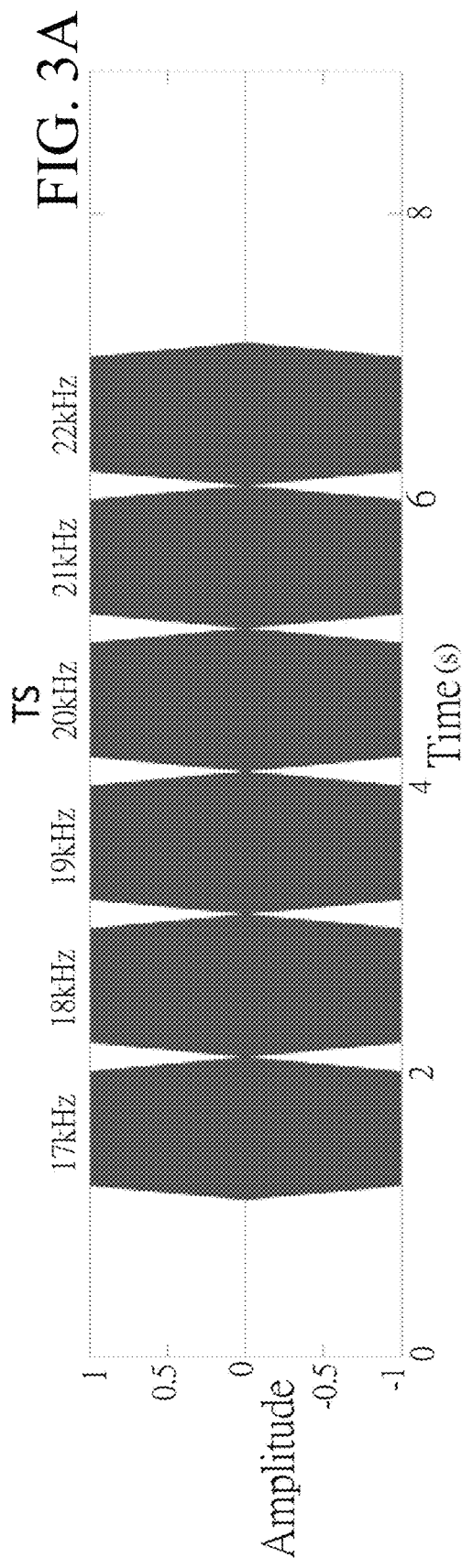
FIG. 3A is a testing signal of the echo delay time estimation method.
Figure 3B:
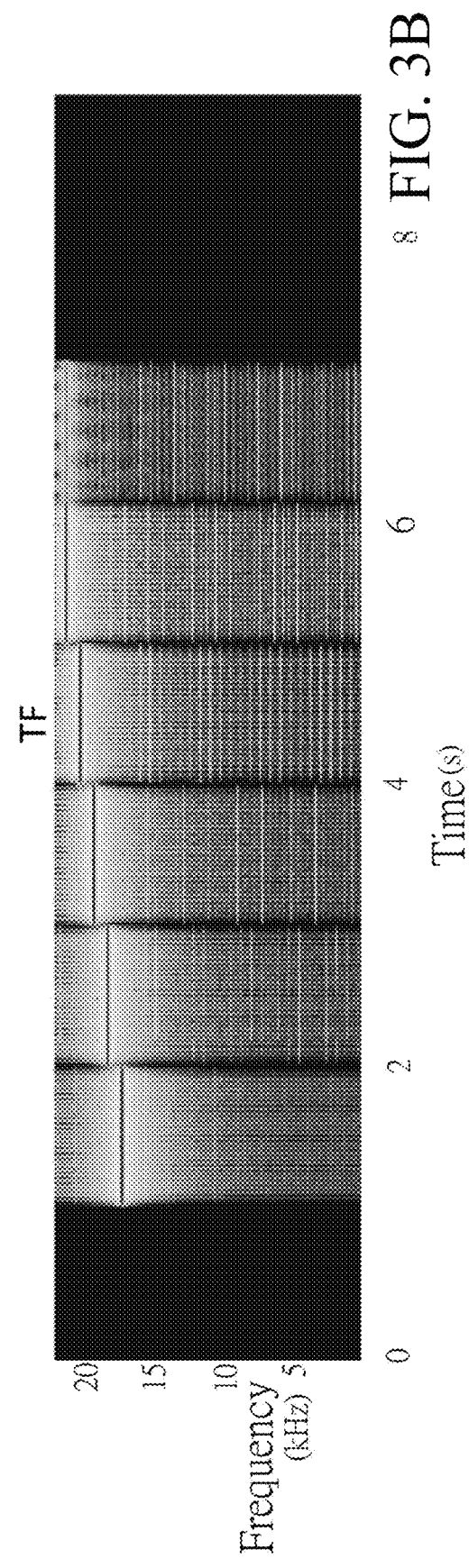
FIG. 3B is a testing signal spectrogram of the echo delay time estimation method.
Figure 4A:
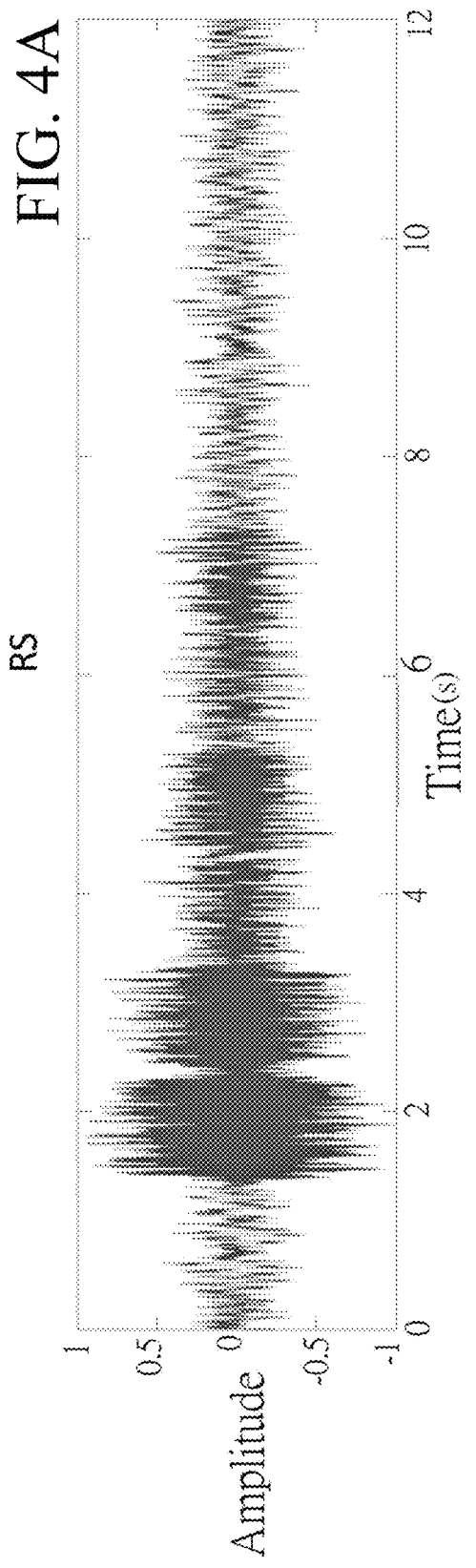
FIG. 4A is a received signal spectrogram of the echo delay time estimation method.
Figure 4B:
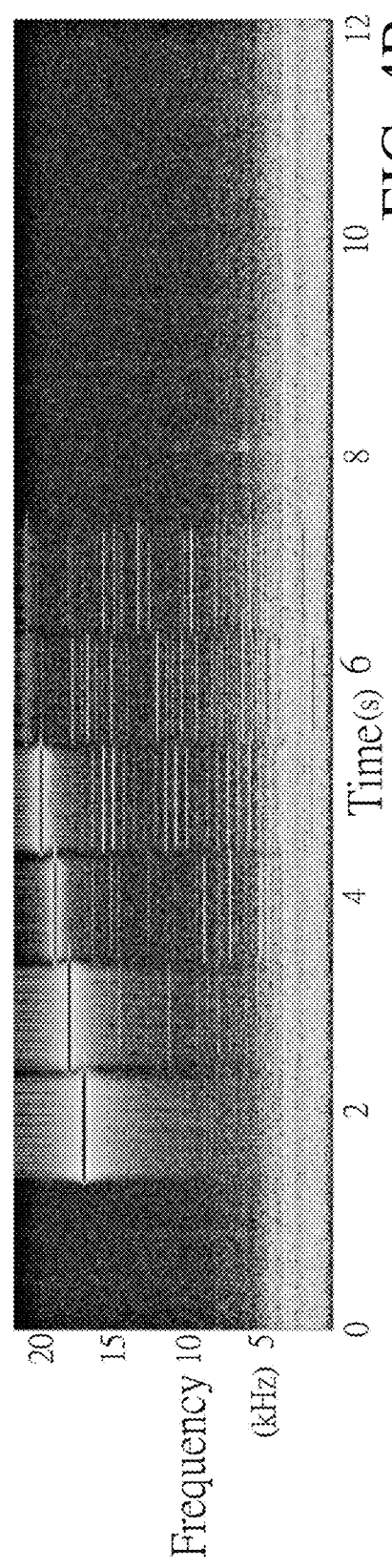
FIG. 4B is a received signal spectrogram of the echo delay time estimation method.

FIGS. 3A and 4A each represent the testing signal TS and the received signal RS in time domain. A necessity to transform both signals from time domain to frequency domain is apparent as the testing signal TS in FIG. 3A looks like a block of wave, because the wave forms are lost given high oscillation frequencies. Though overall envelopes of the oscillating waves are visible, wave frequencies cannot be clearly identified. The received signal RS in FIG. 4A appears to be terribly messy, making it extremely difficult to analyze. FIGS. 3B and 4B each represent the testing signal spectrogram TF and the received signal spectrogram RF. From difference of signal brightness on spectrograms, noise and important signals can be differentiated. Noises would appear to be thin bright lines located across wide ranges, whereas important signals would appear to be thick and dark lines clearly defining distinct frequencies in the spectrogram. Here an important signal can also be called a characteristic signal, being the strongest and the most representative signal in a given time. Noise on the other hand would usually be a blur of thin bright lines in the spectrogram, representing weak signals across many frequencies. As visible in FIG. 4B, background noises can appear particularly in the lower frequency range since background noises are often vibrations caused by low frequency ambient resonances.

In step S240, the dynamic vector calculating device 302 is electrically connected to the pre-processing device 301, receives the testing signal spectrogram TF and the received signal spectrogram RF from the pre-processing device 301, executes a characteristic signal dynamic detection, and generates the testing signal characteristic dynamic vector TV and the received signal characteristic dynamic vector RV. In simple terms, step S240 picks out characteristic frequency dynamic vectors from the testing signal spectrogram TF and the received signal spectrogram RF matrices for comparisons in later steps.

In particularly, with reference to FIG. 1, the echo delay time estimation system includes a broadcasting module 10 and a recording module 20. The broadcasting module 10 is electrically connected to the signal processing module 30 and broadcasts an audio signal PS according to the testing signal TS. The recording module 20 is electrically connected to the signal processing module 30, records the audio signal PS, generates the received signal RS based on the recorded audio signal PS, and sends the received signal RS to the pre-processing device 301 of the signal processing module 30. The pre-processing device 301 also receives the testing signal TS directly from the signal processing module 30. With reference to FIG. 2, the echo delay time estimation method includes the following steps before step S230:

step S200: initiating an echo delay time estimation process to start an estimation when demanded;

step S210: broadcasting an audio signal PS through the broadcasting module 10 according to the testing signal TS;

step S220: recording the audio signal PS through the recording module 20, and generating the received signal RS according to the audio signal PS.

Steps S200 to S220 are meant to simulate real video chat scenarios, for instance, if the testing signal TS is clearly spoken words of a person, the testing signal TS is then broadcasted to another person, and the audio signal PS and the testing signal TS are going to be slightly different due to a speaker quality issue. Regardless of the speaker quality issue, the broadcasted audio signal PS would be picked up by a microphone from the recording module 20 as the received signal RS; in other words, spoken words of a person would be picked up by the microphone of another person, creating an echo between the speaker and the microphone. The echo would not disappear just by simply distancing the speaker and the microphone, because the microphone is far more sensitive than the perception of human ears. A microphone can possibly amplify any small conversations to be an echo between two people.

In the embodiment of the present invention, the testing signal TS is set to be a sequence of multiple single notes, respectively testing different frequencies and recording frequency impulse responses from the echo as the received signal RS. As an example in FIG. 3A, the testing signal TS can generate a 17 kHz signal from t=1 s to t=2 s, an 18 kHz signal from t=2 s to t=3 s, a 19 kHz signal from t=3 s to t=4 s, a 20 kHz signal from t=4 s to t=5 s, a 21 kHz signal from t=5 s to t=6 s, and a 22 kHz signal from t=6 s to t=7 s.

Furthermore, an echo in the frequency spectrum is not only limited to frequencies ranging from 10 Hz to 20000 Hz where human ears can perceive, but also at high frequencies above 20000 Hz to simulate an echo response without bothering anyone.

Figure 5:
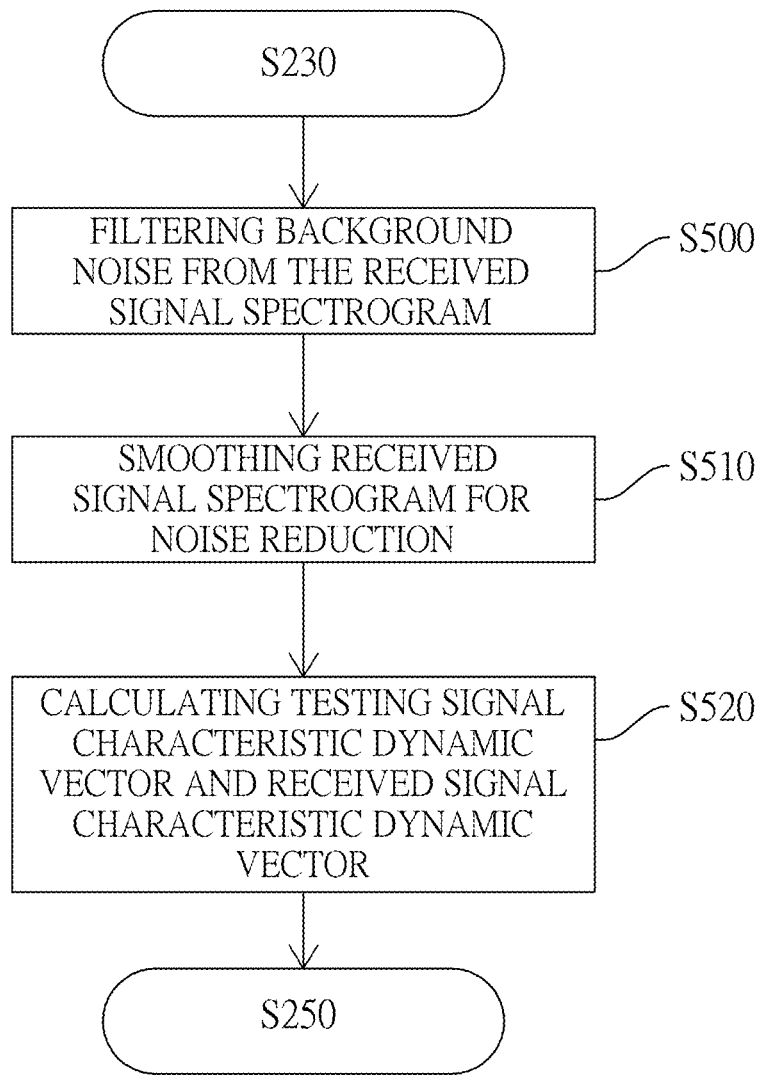
FIG. 5 is a characteristic dynamic vector calculation flow chart of the echo delay time estimation method.

With reference to FIG. 5, step S240 further includes the following sub-steps:

step S500: filtering background noise from the received signal spectrogram RF across respective times;

step S510: smoothing the received signal spectrogram for noise reduction;

step S520: respectively executing a characteristic signal dynamic detection calculation, and generating a testing signal characteristic dynamic vector TV and a received signal characteristic dynamic vector RV.

Regarding step S500, comparing FIGS. 3B and 4B, the lower frequency background noise present in FIG. 4B is absent from the testing signal TS in FIG. 3B, and FIG. 3B looks overall cleaner than FIG. 4B. This is because the testing signal TS in FIG. 3B is more concentrated in frequency spectrum, while the received signal RS in FIG. 4B is more scattered in frequency spectrum due to noises.

In the embodiment of the present invention, the testing signal TS and the received signal RS each have a frequency ranging from 10 Hz to 20000 Hz. When filtering background noises from the received signal spectrogram RF, background noises between frequencies 10 Hz and 20000 Hz are filtered. Noise reduction techniques such as spectral subtraction, Wiener filter, a priori SNR estimation, minimum mean-square error short-time spectral amplitude, and deep neural network can be utilized to reduce noise. These aforementioned noise reduction techniques are commonly known, therefore further discussion about those noise reduction techniques would be omitted here.

In another embodiment of the present invention, the testing signal TS and the received signal RS each have a frequency above 20000 Hz. When filtering background noises from the received signal spectrogram RF, background noises above frequency 20000 Hz are filtered.

Figure 6:
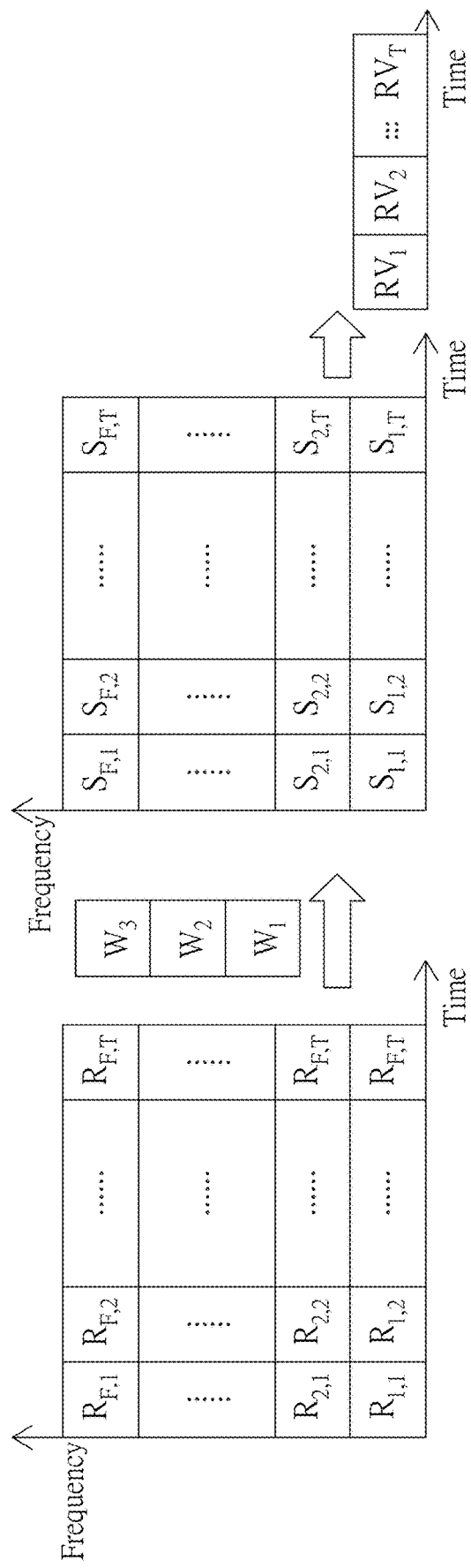
FIG. 6 is a characteristic dynamic vector calculation mathematical perspective view of the echo delay time estimation method.
Figure 7:
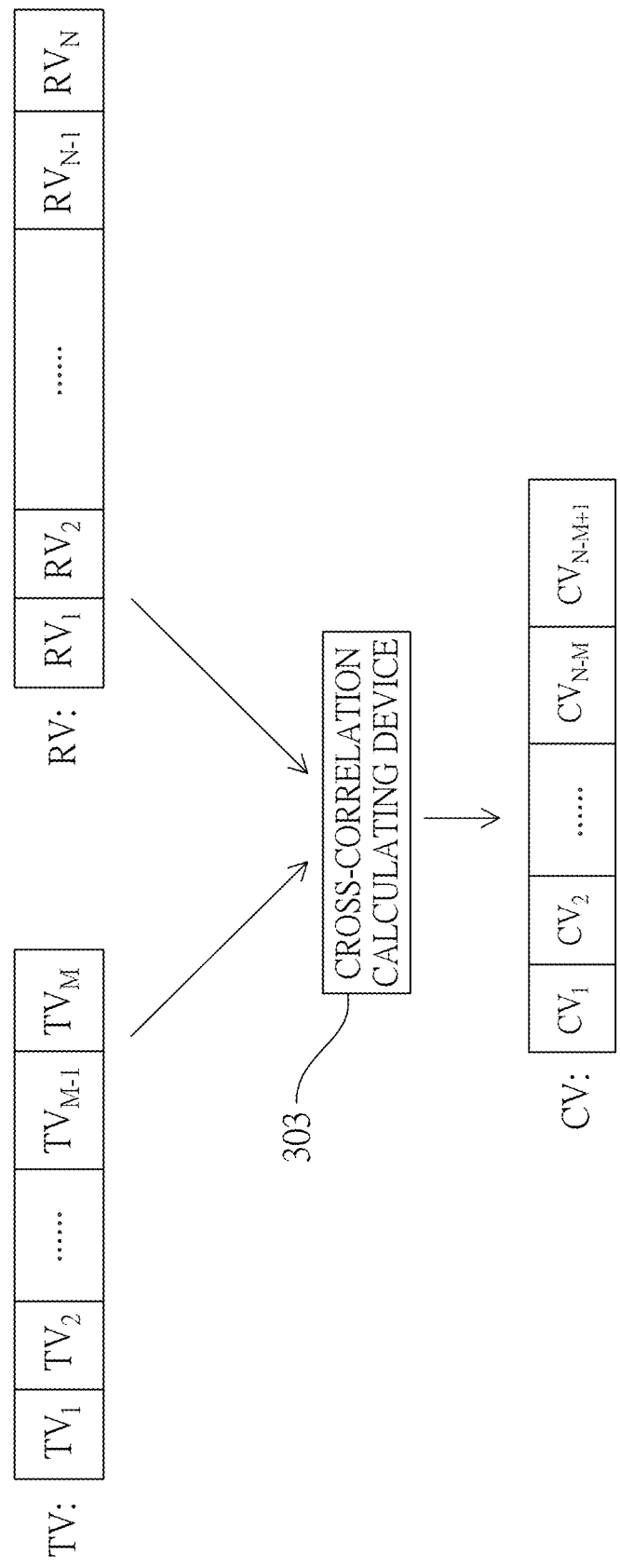
FIG. 7 is a cross-correlated vector calculation mathematical perspective view of the echo delay time estimation method.

Regarding step S510 and with reference to FIG. 6, smoothing is an operation commonly used in statistics. In the embodiment of the present invention, the testing signal spectrogram TF and the received signal spectrogram RF have multiple strength values in multiple frequencies in multiple times. When smoothing the received signal spectrogram RF, each strength value in each frequency in each time along frequency changes is calculated as a moving average. In other words, a middle frequency's strength value would be first summed and then averaged with its surrounding strength values—a high frequency's strength value and a low frequency's strength value, according to customized mathematical weights. This averaged strength value would then update and replace the middle frequency's strength value as a new middle frequency's strength value. The smoothing operation will respectively view every frequency within a time as middle frequency to do the same strength value summing, averaging, and updating procedures mentioned before. The frequencies at the edge of the frequency spectrum can only respectively have their strength values summed and averaged with their one only neighboring frequency's strength value. The smoothing operation is meant to smooth strength values of the frequencies in order to avoid a situation where a signal is unstably recorded between two frequencies. The echo delay time estimation system would handle frequency calculations better after the strength values of frequencies are smoothed.

As an example in FIG. 6, the leftmost matrix represents the received signal spectrogram RF, wherein $R_{f,t}$ ($1 \leq f \leq F$, $1 \leq t \leq T$) represents a strength value of frequency f at time t. In mathematical terms, $W_1$, $W_2$, $W_3$ each represent an operator, and are the mathematical weights for calculating a moving average. For instance, $W_2$ represents the mathematical weight for a middle frequency for calculating the moving average, while $W_1$ and $W_3$ represent the mathematical weights for neighboring frequencies around the middle frequency for calculating the moving average. By changing weights for the moving average, the result of the smoothing operation for the received signal spectrogram RF will be affected. In FIG. 6, the middle matrix represents the received signal spectrogram RF after smoothing operation, wherein $S_{f,t}$ ($1 \leq f \leq F$, $1 \leq t \leq T$) represents a smoothed signal strength amplitude of frequency f at time t. In the present embodiment of the present invention, $R_{f,t}$ ($1 \leq f \leq F$, $1 \leq t \leq T$) and $S_{f,t}$ ($1 \leq f \leq F$, $1 \leq t \leq T$) are mathematically related as follows:

$$S_{f,t} = \begin{cases} R_{1,t}W_2 + R_{2,t}W_3, & \text{if } f = 1 \\ R_{F-1,t}W_1 + R_{F,t}W_2, & \text{if } f = F \\ R_{f-1,t}W_1 + R_{f,t}W_2 + R_{f+1,t}W_3, & \text{if } 2 \leq f \leq F-1 \end{cases}$$

Since the present invention executes a smoothing operation for the received signal spectrogram RF, a possible situation where the received signal RS is unstably recorded in between two frequencies can be avoided, and thus some noises in the frequency spectrum can be filtered. This can effectively handle noises in the received signal RS originated from a speaker or from a microphone. Even if a speaker is unable to broadcast a signal cleanly, the noise would still be filtered out, alleviating some computational complexity for the echo delay time estimation system.

Regarding step S520, the dynamic vector calculating device 302 would pick out a frequency with the strongest strength value of each time as a characteristic frequency, and keeping the characteristic frequency lined up with each respective time the characteristic frequency represents. What remains is a sequence of characteristic frequencies corresponding to different times, decreasing data dimensions from a matrix to a sequence and simplifying computational complexity for the echo delay time estimation system. Therefore, the characteristic frequency of a dynamic vector represents the frequency where the strongest strength value is located in respective time.

For example in FIG. 6, after getting a characteristic frequency from each time t from the middle matrix $S_{f,t}$ ($1 \leq f \leq F$, $1 \leq t \leq T$), a sequence $RV_t$ will be generated. The sequence uses time t to line up the characteristic frequency $RV_t$ from each time, in essence making up the received signal characteristic dynamic vector RV. In the present embodiment of the present invention, the received signal characteristic dynamic vector RV can be calculated as:

$$RV_t = \operatorname{argmax}(S_{1,t}, S_{2,t} \ldots S_{F,t})$$

The present invention picks out frequencies with the strongest strength value of each respective time as the characteristic frequency of each respective time, decreasing a two dimensional data matrix into a one dimension data sequence, simplifying calculations, and alleviating computational complexity for the echo delay time estimation system. The present invention is able to handle non-linear sounds or non-linear environmental changes this way, as all frequencies with weak strength values are filtered away, only a frequency with important characteristic sounds during a video conference is preserved.

In step S250, after the cross-correlation calculating device 303 receives the testing signal characteristic dynamic vector TV and the received signal characteristic dynamic vector RV, executes a cross-correlation vector calculation for the testing signal characteristic dynamic vector TV and the received signal characteristic dynamic vector RV, and generates a cross-correlated vector CV and an echo delay time estimation LE. The cross-correlation vector calculation for the cross-correlated vector CV includes the following steps:

calculating differences of the characteristic frequencies between the received signal characteristic dynamic vector RV and the testing signal characteristic dynamic vector TV in each respective time;

summing values of the differences of the characteristic frequencies in each respective time as a cross-correlated value of a first shift value in the cross-correlated vector CV;

determining whether a final time of the received signal characteristic dynamic vector RV is same as a final time of the testing signal characteristic dynamic vector TV;

when the final time of the received signal characteristic dynamic vector RV matches the final time of the testing signal characteristic dynamic vector TV, determining the cross-correlated vector CV;

when the final time of the received signal characteristic dynamic vector RV mismatches the final time of the testing signal characteristic dynamic vector TV, shifting a time in time domain, calculating the differences of the characteristic frequencies between the received signal characteristic dynamic vector RV and the testing signal characteristic dynamic vector TV in each respective time again, summing values of the differences of the characteristic frequencies in each respective time as the cross-correlated value of a next shift value in the cross-correlated vector CV, and determining whether the final time of the received signal characteristic dynamic vector RV matches the final time of the testing signal characteristic dynamic vector TV again.

The steps described above to determine the cross-correlated vector CV first requires the testing signal characteristic dynamic vector TV and the received signal characteristic dynamic vector RV to have their respective time aligned. After the time alignment, the cross-correlation vector calculation would be recorded into the cross-correlated vector CV with each iteration. With each iteration, the testing signal characteristic dynamic vector TV and the received signal characteristic dynamic vector RV would misalign in time with a time shift value, and each shift would result in a different cross-correlation vector calculation to be recorded into the cross-correlated vector CV. In the present embodiment of the present invention, the cross-correlated vector CV is estimated as:

$$CV_i = \frac{1}{\sum_{j=1}^{M} |TV_j - RV_{j+i-1}|}, 1 \leq i \leq N - M + 1$$

Through monitoring changes in the cross-correlated vector CV, a location of the biggest cross-correlated value within the cross-correlated vector CV can be found, and according to the location, a time shift value can be calculated. Once the time shift value is calculated, an echo delay time estimation LE can also be calculated, because finding the biggest cross-correlated value symbolizes that after several shifts the received signal RS resembles the testing signal TS in the frequency domain. If the delay time shift is too much or too little, the cross-correlated value would become smaller as the two signals become less and less correlated. The delay time shift for the biggest cross-correlated value converted to time domain would be a delay time, also known as an echo delay time estimation LE. On the other hand, if the cross-correlated value is in the numerator instead of in the denominator, then a location of a smallest cross-correlated value would similarly correspond to the echo delay time estimation LE in the time domain. Both ways use the same principles, but just different mathematical treatments to estimate the echo delay time estimation LE.

Since each cross-correlated value in the cross-correlated vector CV is a reciprocal of a sum of a difference of each characteristic frequency between the testing signal characteristic dynamic vector TV and the received signal characteristic dynamic vector RV, when the testing signal characteristic dynamic vector TV and the received signal characteristic dynamic vector RV resemble each other more, the sum of the difference will become smaller, so the reciprocal of the sum of the difference will become greater. Therefore, the biggest value of each cross-correlated value in the cross-correlated vector CV represents the closest resemblance of characteristic frequencies of the testing signal characteristic dynamic vector TV and the received signal characteristic dynamic vector RV after the shift. The shift amount can be calculated with the amount of shifting iterations recorded, and the shift amount can be used to calculate an echo delay time estimation LE.

Figure 8:
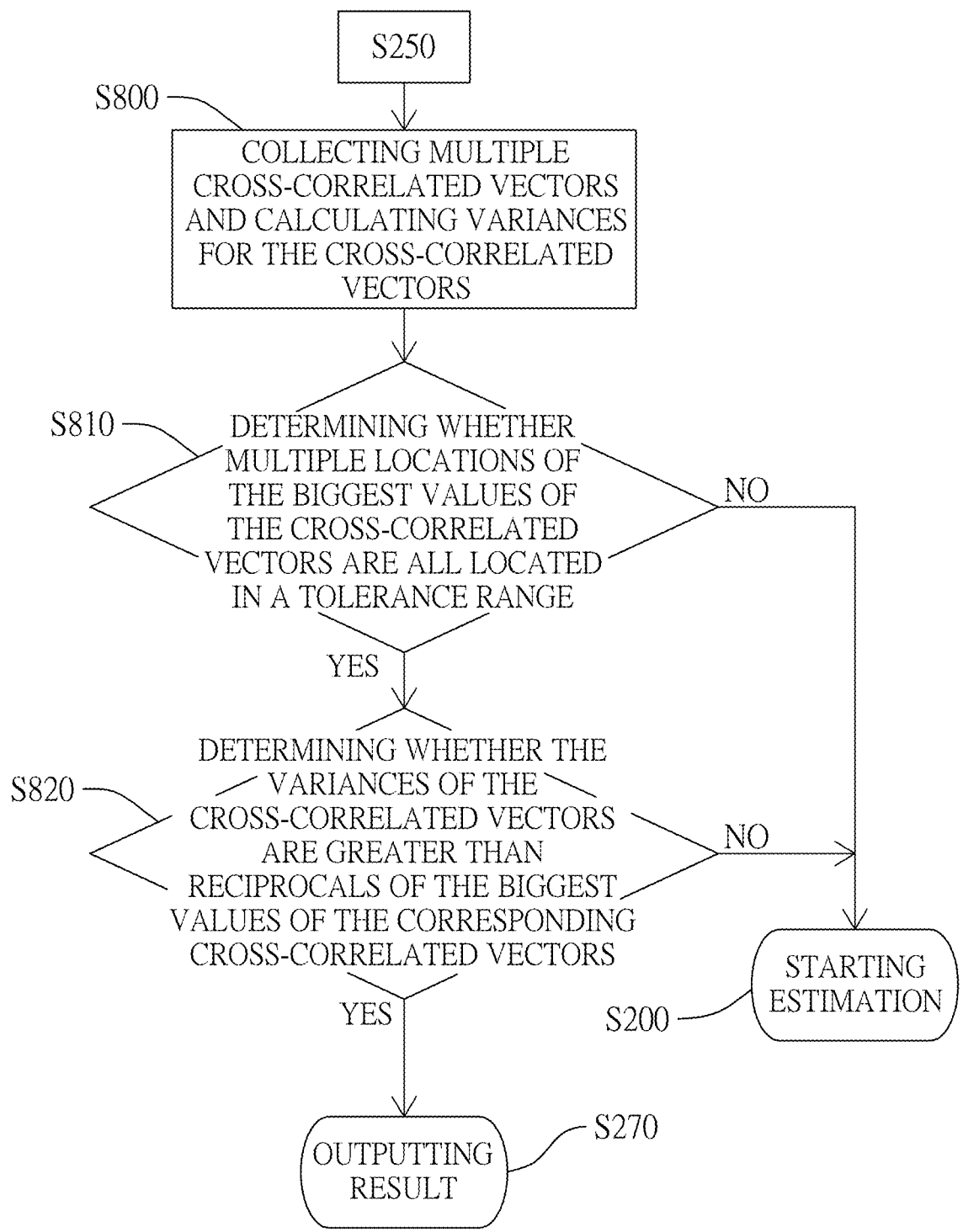
FIG. 8 is an exception determining flow chart of the echo delay time estimation method.

Furthermore, after step S250, the echo delay time estimation method still includes the following steps:

step S260: determining whether an exception has occurred;

With reference to FIG. 8, step S260 includes the following sub-steps:

step S800: executing steps S210 to S250 multiple times for collecting multiple cross-correlated vectors CV, and calculating multiple variances for the cross-correlated vectors CV;

step S810: determining whether multiple locations of the biggest values of the cross-correlated vectors CV are all located in a tolerance range; the tolerance range can be set to be a specific time, or can be set to be a percentage threshold for the measured echo delay time estimation LE;

step S820: when the locations of the biggest values of the cross-correlated vectors CV are all located in the tolerance range, further determining whether the variances of the cross-correlated vectors CV are greater than reciprocals of the biggest values of the corresponding cross-correlated vectors CV;

when the variances of the cross-correlated vectors CV are greater than the reciprocals of the biggest values of the corresponding cross-correlated vectors CV, executing the step S270, wherein without exception an echo is recorded;

when the variances of the cross-correlated vectors CV are lesser than the reciprocals of the biggest values of the corresponding cross-correlated vectors CV, executing the step S200, wherein an exception has occurred that an echo is unlikely recorded;

when any one of the locations of the biggest values of the cross-correlated vectors CV is out of the tolerance range, executing the step S200, wherein an exception has occurred that an echo is unlikely recorded.

The echo delay time estimation system includes an exception determining device 304. The exception determining device 304 is electrically connected to the cross-correlation calculating device 303, receives several iterations of the cross-correlated vector CV, calculates variance for those cross-correlated vectors CV, and determines whether the locations of the biggest values of the cross-correlated vectors CV are all located in the tolerance range. When the locations of the biggest values of the cross-correlated vectors CV are all located in the tolerance range, the exception determining device 304 further determines whether the variances of the cross-correlated vectors CV are greater than the reciprocals of the biggest values of the corresponding cross-correlated vectors CV. When the variances of the cross-correlated vectors CV are indeed greater than the reciprocals of the biggest values of the corresponding cross-correlated vectors CV, the exception determining device 304 calculates the echo delay time LR, as without exception an echo has been recorded. When the variances of the cross-correlated vectors CV are lesser than the reciprocals of the biggest values of the corresponding cross-correlated vectors CV, the exception determining device 304 stops outputting the echo delay time LR, as an exception has occurred that an echo is unlikely recorded, and the pre-processing device 301 is set to receive a testing signal TS and a received signal RS again to start a new echo delay time estimation. When any one of the locations of the biggest values of the cross-correlated vectors CV is located out of the tolerance range, the exception determining device 304 also stops outputting the echo delay time LR, as an exception has occurred that an echo is unlikely recorded, and also the pre-processing device 301 is set to receive a testing signal TS and a received signal RS again to start a new echo delay time estimation.

Through the exception determining device 304, a situation wherein the echo delay time LR is wrongly calculated due to excessive loud noises in a delay time measurement can be avoided, increasing accuracy for calculating the echo delay time LR.

What is claimed is:

1. An echo delay time estimation method, comprising the following steps:
   a. receiving a testing signal and a received signal;
   b. respectively executing a time to frequency analysis for the testing signal and the received signal to generate a testing signal spectrogram and a received signal spectrogram;
   c. respectively executing a characteristic signal dynamic detection calculation for the testing signal spectrogram and the received signal spectrogram to generate a testing signal characteristic dynamic vector and a received signal characteristic dynamic vector;

d. executing a cross-correlated vector calculation for the testing signal characteristic dynamic vector and the received signal characteristic dynamic vector to generate a cross-correlated vector; and
e. calculating an echo delay time according to the cross-correlated vector.

2. The echo delay time estimation method as claimed in claim 1, wherein before the step c, the method further comprises the following step:
filtering out background noises in the received signal spectrogram.

3. The echo delay time estimation method as claimed in claim 2, wherein
frequencies of the testing signal and the received signal both range from 10 Hz to 20000 Hz; and
frequencies of the background noises range from 10 Hz to 20000 Hz.

4. The echo delay time estimation method as claimed in claim 2, wherein
frequencies of the testing signal and the received signal are both above 20000 Hz; and
frequencies of the background noises are above 20000 Hz.

5. The echo delay time estimation method as claimed in claim 2, wherein before the step c, the method further comprises the following step:
executing a smoothing operation to the received signal spectrogram.

6. The echo delay time estimation method as claimed in claim 5, wherein
the testing signal spectrogram and the received signal spectrogram each comprise multiple strength values corresponding to multiple frequencies and multiple times;
the smoothing operation is calculating moving averages of the strength values.

7. The echo delay time estimation method as claimed in claim 1, wherein
the testing signal spectrogram and the received signal spectrogram each comprise multiple strength values corresponding to multiple frequencies and multiple times;
the step c further comprises the following sub-steps:
selecting frequencies corresponding to the biggest strength values in each of the times as characteristic frequencies, and
outputting a characteristic dynamic vector;
wherein the characteristic dynamic vector comprises the characteristic frequencies in each of the times.

8. The echo delay time estimation method as claimed in claim 1, wherein the step d further comprises the following sub-steps:
calculating differences of the characteristic frequencies between the received signal characteristic dynamic vector and the testing signal characteristic dynamic vector in each respective time;
summing values of the differences of the characteristic frequencies in each respective time as a cross-correlated value of a first shift value in the cross-correlated vector;
determining whether a final time of the received signal characteristic dynamic vector is same as a final time of the testing signal characteristic dynamic vector;
when the final time of the received signal characteristic dynamic vector matches the final time of the testing signal characteristic dynamic vector, determining the cross-correlated vector;
when the final time of the received signal characteristic dynamic vector mismatches the final time of the testing signal characteristic dynamic vector, shifting a time in time domain, calculating the differences of the characteristic frequencies between the received signal characteristic dynamic vector and the testing signal characteristic dynamic vector in each respective time again, summing values of the differences of the characteristic frequencies in each respective time as the cross-correlated value of a next shift value in the cross-correlated vector, and determining whether the final time of the received signal characteristic dynamic vector matches the final time of the testing signal characteristic dynamic vector again.

9. The echo delay time estimation method as claimed in claim 1, wherein the step e further comprises the following sub-steps:
determining the biggest cross-correlated value in the cross-correlated vector;
calculating an echo delay time according to the biggest cross-correlated value.

10. The echo delay time estimation method as claimed in claim 1, wherein the time to frequency analysis is a short-time Fourier transform (STFT) or a Goertzel filter.

11. The echo delay time estimation method as claimed in claim 1, wherein after the step d, the method further comprises the following steps:
executing step a to step d multiple times for collecting multiple cross-correlated vectors, and calculating variances of the cross-correlated vectors;
determining whether multiple locations of the biggest values of the cross-correlated vectors are all located in a tolerance range;
when the locations of the biggest values of the cross-correlated vectors are all located in the tolerance range, further determining whether the variances of the cross-correlated vectors are greater than reciprocals of the biggest values of the cross-correlated vectors;
when the variances of the cross-correlated vectors are greater than the reciprocals of the biggest values of the cross-correlated vectors, executing the step e;
when the variances of the cross-correlated vectors are less than the reciprocals of the biggest values of the cross-correlated vectors, executing the step a;
when any one of the locations of the biggest values of the cross-correlated vectors is out of the tolerance range, executing the step a.

12. An echo delay time estimation system comprising:
a signal processing module, having a pre-processing device, a dynamic vector calculating device, and a cross-correlation calculating device; wherein:
the pre-processing device receives a testing signal and a received signal, and respectively executes a time to frequency analysis to generate a testing signal spectrogram and a received signal spectrogram;
the dynamic vector calculating device receives the testing signal spectrogram and the received signal spectrogram, and respectively executes a characteristic signal dynamic detection calculation for the testing signal spectrogram and the received signal spectrogram to generate a testing signal characteristic dynamic vector and a received signal characteristic dynamic vector; and
the cross-correlation calculating device receives the testing signal characteristic dynamic vector and the received signal characteristic dynamic vector, executes a cross-correlation vector calculation for the testing signal characteristic dynamic vector and the received signal characteristic dynamic vector to generate a cross-correlated vector, and calculates an echo delay time according to the cross-correlated vector.

13. The echo delay time estimation system as claimed in claim 12, further comprising a broadcasting module;
   wherein the broadcasting module is electrically connected to the signal processing module, and broadcasts an audio signal according to the testing signal.

14. The echo delay time estimation system as claimed in claim 12, further comprising a recording module;
   wherein the recording module is electrically connected to the signal processing module, records the audio signal, generates the received signal according to the recorded audio signal, and sends the received signal to the pre-processing device of the signal processing module.

15. The echo delay time estimation system as claimed in claim 12, further comprising an exception determining device;
   wherein the exception determining device is electrically connected to the cross-correlation calculating device, receives multiple cross-correlated vectors, calculates variances of the cross-correlated vectors, and determines whether multiple locations of the biggest value of the cross-correlated vectors are all located in a tolerance range;
   wherein when the locations of the biggest values of the cross-correlated vectors are all located in the tolerance range, the exception determining device further determines whether the variances of the cross-correlated vectors are greater than reciprocals of the biggest values of the cross-correlated vectors;
   wherein when the variances of the cross-correlated vectors are greater than the reciprocals of the biggest values of the cross-correlated vectors, the exception determining device calculates an echo delay time according to the cross-correlated vector;
   wherein when the variances of the cross-correlated vectors are less than the reciprocals of the biggest values of the cross-correlated vectors, the exception determining device stops outputting the echo delay time;
   wherein when any one of the locations of the biggest values of the cross-correlated vectors is out of the tolerance range, the exception determining device stops outputting the echo delay time.

\* \* \* \* \*